United States Patent

[11] 3,600,914

[72] Inventors Marshall A. Johnson
 Mundelein;
 Herbert J. Kincaid, Libertyville, both of, Ill.
[21] Appl. No. 810,460
[22] Filed Mar. 26, 1969
[45] Patented Aug. 24, 1971
[73] Assignee The Illinois Lock Company

[54] THEFT-PREVENTION DEVICE FOR TRACTOR-DRAWN TRAILERS
 1 Claim, 4 Drawing Figs.
[52] U.S. Cl. .................................................. 70/232, 70/165, 85/32 K
[51] Int. Cl. ............................................. E05b 65/12, B60r 25/00
[50] Field of Search .................................. 70/232, 14, 57, 58, 34, 178, 165; 339/272.1; 85/32 K, 32 W; 292/350

[56] References Cited
UNITED STATES PATENTS
397,988 2/1889 Kimball .......................... 85/32
1,422,372 7/1922 Pardee .......................... 70/165
1,557,911 10/1925 White ............................ 70/232 X
1,934,327 11/1933 Ridder .......................... 70/232 X
2,186,678 1/1940 Johnston ....................... 292/350
2,554,306 5/1951 Mack ............................ 70/232 X
FOREIGN PATENTS
689,737 6/1964 Canada .......................... 70/232

Primary Examiner—Albert G. Craig, Jr.
Attorney—Hofgren, Wegner, Allen, Stellman & McCord ABSTRACT: A theft-prevention device for use with a tractor-trailer combination wherein the trailer has a downwardly extending pin on the bottom thereof adapted to fit an engaging plate on the tractor. The device includes a cover for the pin to prevent the tractor plate from engaging the pin. A threaded studbolt is disposed entirely within the cover with one end of the bolt selectively locking the cover onto the pin. The other end of the studbolt is exposed in an opening which extends into the cover with the opening providing access to the studbolt for rotating the same into locking engagement with the pin. A lock plug assembly is disposed at the outer end of the opening for selectively closing the opening to prevent access to the studbolt.

PATENTED AUG 24 1971

3,600,914

INVENTORS
Marshall A. Johnson
Herbert S. Kincaid
BY Hofgren, Wegner, Allen, Stellman & Cox
ATTORNEYS

THEFT-PREVENTION DEVICE FOR TRACTOR-DRAWN TRAILERS

SUMMARY OF THE INVENTION

This invention relates to a theft-prevention device for use in connection with tractor-drawn trailers. Such trailers generally have a coupling pin (the "king" pin) extending downwardly from the bottom of the trailer near the front. The tractor has a circular engaging plate adapted to slide under the trailer, lift the front end from the ground and engage the coupling pin. When the pin is locked into engagement with the engaging plate, the trailer then can be hauled about by the tractor.

The principal object of this invention is to provide a theft-prevention device which will prevent unauthorized coupling of a tractor to a trailer. U.S.

A further object of the invention is to provide a new and improved cover for trailer coupling pins which will prevent engagement of a tractor with the coupling pin when the cover is locked in place on the pin.

Still another object of the invention is to provide a new and improved lock-on cover for trailer coupling pins of such shape that it cannot be engaged by a tractor but will slide on top of the trailer engaging plate if unauthorized coupling is attempted.

Yet a further object of this invention is to provide a theft-prevention device of the character described which has a hemispherical cover having an interior cavity for receiving the coupling pin and to prevent the tractor engaging plate from engaging the pin. A threaded studbolt is disposed entirely within the cover with one end of the bolt extending into the cavity for rotatable advancement toward the coupling pin to a locking position overlying an upwardly facing shoulder on the pin to lock the cover onto the pin. The other end of the bolt is exposed within an access opening extending into the cover to permit access to the studbolt for rotating the bolt. A key-operated lock plug assembly selectively closes the access opening to prevent access to the threaded studbolt. The lock plug assembly includes a cam member rotatable, by a key inserted into the plug assembly, to a locking position behind an inwardly facing shoulder within the access opening. Preferably, the cover has a slot extending thereinto transverse to the access opening and through the opening. An insert member is disposed in the slot and has a shape corresponding to the slot with a hole through the member in alignment with the access opening. The hole in the insert member is threaded to receive the studbolt and thereby eliminate having to form threads on the inside of the remainder of the access opening.

Other objects, features and advantages of the invention will become apparent from the following detailed description taken in connection with the accompanying drawings.

DETAILED DESCRIPTION OF THE INVENTION

Figure 1:
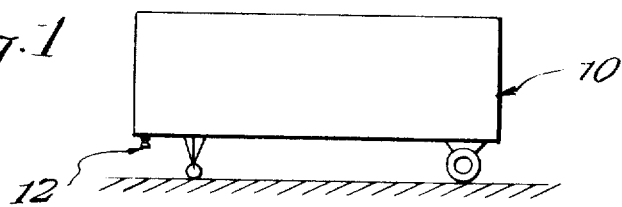
FIG. 1 is a side elevational view of a tractor-drawn trailer having a coupling pin on the underside thereof near the front.

Referring to the drawings in greater detail, FIG. 1 shows a tractor-drawn trailer, generally designated 10, which is provided with a "king" pin or trailer-coupling pin, generally designated 12, extending downwardly on the underside of the trailer near the front thereof. The coupling pin comprises a depending cylindrical portion 14 with an annular groove 16 between the cylindrical portion and a circular base portion 18 which defines an upwardly facing shoulder 18a. The coupling pin is designed to engage an engaging plate on a tractor. However, the engaging plate and tractor are not shown in the drawings in that it is of usual form and is well known in the art. It is sufficient to state that the engaging plate is inclined and has a slot or hook portion which fits into the annular groove 16 with the circular base portion 18 of the coupling pin preventing the hook from sliding off of the pin. The dimensions of the coupling pin on the trailer have become more or less standardized in order to permit the trailer to be drawn by a variety of tractors and it readily will be understood that under such conditions an unguarded trailer could be coupled to a tractor and hauled away by thieves. The apparatus to be described hereinafter is designed to prevent coupling of the trailer and tractor by unauthorized persons.

The locking device includes a hemispherical cover 20 which has an interior cavity 22 for receiving the coupling pin 12. A pinlock means in the form of a threaded studbolt, generally designated 24, is disposed entirely within the cover 20 with the inner end thereof extending into the cavity 22 for selectively locking the cover 20 onto the coupling pin 12, as will be described in greater detail hereinafter. An access opening 26 extends from the outer periphery of the cover 20 for threadingly receiving the studbolt 24 and to permit access to the studbolt for rotating the same to move the studbolt toward and away from the coupling pin 12. The outer face of the studbolt has a hexagonal hole 28 for receiving one end of a standard hex wrench which may be utilized to rotate the studbolt. Obviously, other irregularly shaped holes and wrenches or key members may be employed.

In the preferred embodiment of the invention, a portion of the cover 20 comprises an insert member 30 received in a groove 32 which opens toward the underside of the trailer 10. The access opening 26 extends through the insert member 30 and it is that portion of the opening 26 which is threaded for rotatably receiving the studbolt 24. The insert member 30 thereby eliminates having to thread portions of the opening 26 on the interior of the cover 20, which would be somewhat difficult and expensive.

Figure 2:
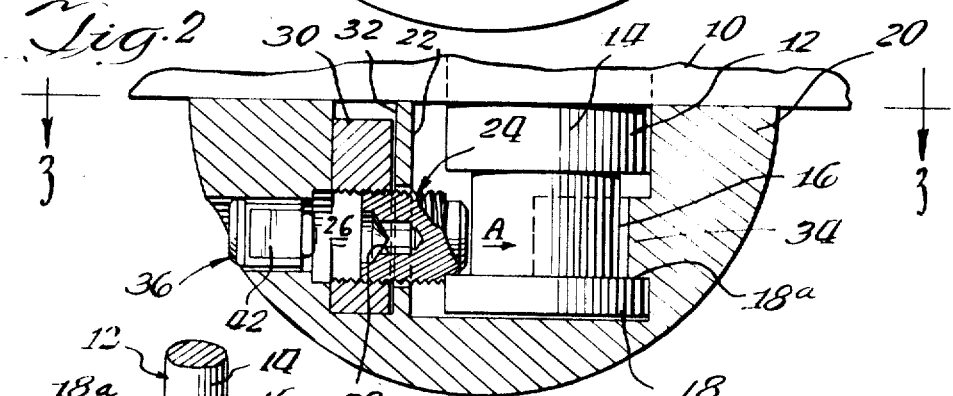
FIG. 2 is a central sectional view of the theft-prevention device of this invention in locking position on the coupling pin of the trailer.
Figure 4:
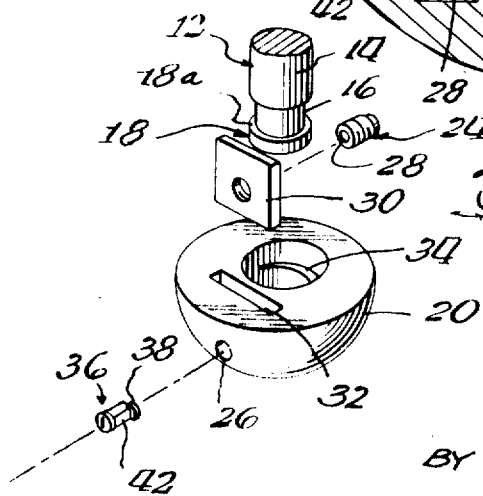
FIG. 4 is an exploded perspective view, on a reduced scale, of the theft-prevention device shown in FIGS. 2 and 3.

From the above, it readily is apparent that rotatable advancement of the threaded studbolt 24 in the direction of arrow A (FIG. 2) toward the coupling pin 12 moves the inner end of the studbolt into the groove 16 of the coupling pin, overlying the shoulder 18a to lock the cover 20 in place onto the coupler pin. In addition, a tapered, semicircular annular rib 34 on the interior of the cover 20 extends inwardly into the cavity 22 in alignment with the groove 16 of the coupling pin 12 to overlie the shoulder 18a diametrically opposite the studbolt 24. Thus, continued advancement of the studbolt in the direction of arrow A will cause relative movement of the cover 20 and the coupling pin 12 in a direction opposite that of arrow A to move the rib 34 over the shoulder 18a. The combination of the rib 34 and studbolt 24 provides a sturdy and stable lock between the cover and the pin.

Figure 3:
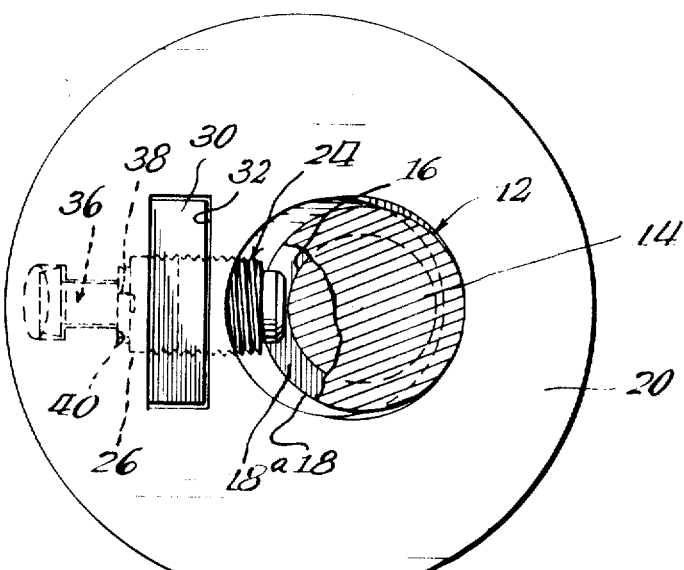
FIG. 3 is a section taken generally along the line 3—3 of FIG. 2, showing a top plan view of the theft-prevention device.

A lock plug assembly, generally designated 36, is disposed in the outermost end of the access opening 26 for selectively closing the opening to prevent access to the studbolt 24. The lock plug assembly is key operated and includes a cam member 38 which is rotatable by a key inserted into the plug assembly to a locking position behind an inwardly facing shoulder 40 (FIG. 3) formed in the access opening 26. The lock plug assembly 36 has at least one flat side portion 42 to prevent rotation of the lock plug assembly as the cam member 38 is rotated between locking and unlocking positions. With this arrangement, it will be understood that should a thief manage to shimmy or "pick" the lock plug assembly 36 and be able to rotate the cam member 38 and remove the lock plug assembly, he will be surprised to discover that he has yet another pinlock means in the form of the studbolt 24 locking the cover. In most instances, without advance knowledge, persons most likely would not have a wrench or other tool available which would fit the studbolt for rotating the same.

The foregoing detailed description has been given for clearness of understanding only and no unnecessary limitations should be understood therefrom as some modifications will be obvious to those skilled in the art.

I claim:

1. For a tractor-trailer combination wherein the trailer has a downwardly extending pin on the bottom, the pin being adapted to fit an engaging plate on the tractor, a theft-prevention device comprising: a cover for said pin to prevent the tractor plate from engaging the pin, said cover having an interior cavity for receiving the pin, an opening through the cover to said cavity, said opening having an outer small-diameter portion and an inner large-diameter portion with an inwardly facing shoulder between said portions, a slot extending into the cover transverse to said opening and through the large-diameter portion of said opening, an insert member in said slot and of a shape corresponding generally to the slot, said insert member having a threaded hole therethrough in alignment with said opening, and a studbolt disposed entirely within the large-diameter portion of said opening and said cavity of said cover and threaded only into the hole in the insert member, said opening being unthreaded, the bolt being rotatable for advancement into the cavity so that the inner end of the bolt may move into locking engagement with a trailer pin, the other end of the bolt having means exposed through the small-diameter portion of said opening for rotating the bolt, and a removable lock plug assembly positionable in the small-diameter portion of the opening for selectively closing said opening to prevent access to the means for rotating the studbolt, the lock plug assembly including a cam member rotatable by a key inserted into the plug assembly to a locking O-rings. behind said shoulder.